United States Patent [19]

Goldberg et al.

[11] Patent Number: 4,612,246

[45] Date of Patent: Sep. 16, 1986

[54] LUBRICATED POLYESTER ENAMELED ELECTRICAL CONDUCTORS

[75] Inventors: Newton N. Goldberg, Penn Hills Township, Allegheny County; Jacques S. Merian, Plum Boro, both of Pa.

[73] Assignee: Westinghouse Electric Corp., Pittsburgh, Pa.

[21] Appl. No.: 714,609

[22] Filed: Mar. 21, 1985

[51] Int. Cl.$^4$ .................. B32B 15/00; B32B 27/00; H01B 7/00
[52] U.S. Cl. .................. 428/379; 174/110 FC; 174/110 PM; 428/383
[58] Field of Search .............. 428/379, 375, 383, 421, 428/422; 174/110 PM, 110 FC; 528/299

[56] References Cited

U.S. PATENT DOCUMENTS 2,902,473  9/1959  Smith .................. 528/299
3,338,743  8/1967  Laganis ................ 528/299

Primary Examiner—Lorraine T. Kendell
Attorney, Agent, or Firm—Daniel P. Cillo

[57] ABSTRACT

An electrical conductor is coated with a cured, lubricating polyester type wire enamel, where the polyester type wire enamel, before heat reaction, contains acid, and hydroxyl components containing fluorinated alcohol and non-fluorinated polyol, and where a fluorinated aliphatic alcohol having a perfluoroalkyl group from 4 carbon atoms to 12 carbon atoms constitutes from 8 wt. % to 30 wt. % of the total fluorinated alcohol plus non-fluorinated polyol content of the unreacted wire enamel.

14 Claims, No Drawings

LUBRICATED POLYESTER ENAMELED ELECTRICAL CONDUCTORS

BACKGROUND OF THE INVENTION

Polyester resins, such as those taught by Meyer et al., in U.S. Pat. No. 3,342,780, polyester-imides, as taught by Schmidt et al., in U.S. Pat. No. 3,793,250, and polyester-amide-imides, such as those taught by Sattler in U.S. Pat. Nos. 3,555,113 and 3,652,471 and by Kwiecinski, in U.S. Pat. No. 4,117,032, have been used to coat and overcoat electrical conductors. In a continuous wire enameling process, a wire is passed into a bath containing a wire enamel, then through a die, followed by baking in an oven to cure the coating. After several continuous passes, the enameled wire can be made into coils for electric motors or the like by means of automatic winding machines.

In such machines, the enameled wires are subjected to severe mechanical abrasion. This consideration, plus the need for "slip", i.e., reducing friction between contacting enameled wires during winding, which allows for putting more conductor in a motor slot or the like, and thus increasing the power the electrical machine can deliver, resulted in the improved, lubricated coatings of Sattler et al., and Merian, in U.S. Pat. Nos. 3,413,148, and 3,775,175 respectively. In Sattler et al., a thin or discontinuous film of polyethylene is used to cover the enamel, and in Merian, a dispersion of polyethylene is mixed with the wire enamel before enamel coating. While these coatings, using external lubricating agents, are effective to provide lubricity to a certain degree, an enamel having the lubricity entity as an integral part of the polymer forming the coating would be desirable.

In other areas, fluorine containing compounds have been used to make organic, fibrous materials that are oil and water repellent. Ahlbrecht, in U.S. Pat. No. 3,171,861, teaches fluorinated aliphatic alcohols containing perfluoroalkyl groups with 3 to 12 carbon atoms as intermediates in the preparation of: perfluoroalkyl-substituted triazines, which when reacted with formaldehyde yield compounds useful as thermosetting resins exhibiting oil and water repellent characteristics; perfluoroalkyl acrylates, useful as oil and water repellent coatings for fabric or paper; and perfluoroalkyl halomethyl ethers and their quarternary amine salts, useful as oil resistant coatings for textiles, paper, leather and wood. Smeltz, in U.S. Pat. No. 3,504,016, teaches fluorinated polyesters, useful as oil and water repellent fabric coatings, where the polyesters are prepared from perfluoroalkyl-terminated, alkyl-1,3-propane diol, and a dibasic acid, such as malonic acid, succinic acid, phthalic acid, terephthalic acid, or the like, with optional addition of a nonhalogenated diol, such as ethylene glycol, tetraethylene glycol, 1, 4-cyclohexane diol, or the like.

SUMMARY OF THE INVENTION

The above-mentioned abrasion and "slip" problems have been solved and the above needs met by co-reacting a fluorinated aliphatic alcohol having a perfluoroalkyl group of from 4 carbon atoms to 12 carbon atoms with a nonfluorine containing polyol component of a polyester and/or polyester-amide-imide enamel composition, where the term "polyol" is used throughout to mean a compound having two or more hydroxyl groups. Thus, the poly-fluorinated reactant is chemically combined in the polymer matrix of the cured insulation coating, providing low surface energy and low coefficient of friction. This heat curable enamel is useful as a surface coating for copper or aluminum electrical conductors, which, after enamel cure, can be wound into electrical coils with good "slip" and improved abrasion resistance.

In the event the lubricated polyester coating precludes the addition of subsequent layers of enamel film, then the lubricated coating can be used as a final pass, or overcoat, in the wire coating process. In addition to the lubricity properties of the fluorinated aliphatic alcohols, they enhance the thermal and chemical stability of the system. The fluorinated aliphatic alcohols can be co-reacted in the range of from 8 wt. % to 30 wt. %, based on total weight of non-fluorinated containing polyol plus fluorinated alcohol in the wire enamel formulation. In the case of a simple polyester reaction product of fluorine free polyols with polycarboxylic acids, the fluorinated aliphatic alcohol can substitute for from about 5 wt. % to about 35 wt. % of the fluorine-free polyol used. In the case of a more complicated polyester-amide-imide, which can be an admixture of polyester, polyester-amide-imide, phenolic, and isocyanate, the fluorinated aliphatic alcohol can substitute for from about 5 wt. % to about 35 wt. % of the total fluorine-free polyol used in all the polyester components of the enamel.

DESCRIPTION OF THE PREFERRED EMBODIMENTS

The heat curable, lubricated, polyester type wire coating enamels of this invention contain polyester resins having hydroxyl components containing from about 65 wt. % to about 95 wt. % of fluorine-free polyol having two or more hydroxyl groups co-reacted with from 8 wt. % to 30 wt. % of a fluorinated aliphatic alcohol having a perfluoroalkyl group of from 4 carbon atoms to 12 carbon atoms. By the term "polyester type" wire enamel is meant that some ester linkages are present in the polymer which may also contain other linkages, such as amide linkages, imide linkages, and the like.

Useful polyester type wire coatings of this invention will contain at least one blend of polycarboxylic acid and polyol plus fluorine containing alcohol components, and are useful as the sole coating or as an overcoat on copper or aluminum electrical conductors. Useful polycarboxylic acids can include: (1) aromatic dicarboxylic acids, such as phthalic acid, terephthalic acid; isophthalic acid; and their mixtures, (2) cycloaliphatic dicarboxylic acids, such as tetrahydrophthalic acid, (3) tricarboxylic acids, such as trimellitic anhydride, (4) unsaturated aliphatic dicarboxylic acids, such as maleic acid; fumaric acid; and their mixtures, and (5) saturated aliphatic dicarboxylic acids, such as succinic acid; glutaric acid; adipic acid; pimelic acid; sebacic acid; azelaic acid; suberic acid, and the like, and their mixtures, or mixtures of these acid types. In all cases where applicable, the acid anhydride form can be used in place of the acid form. The carboxylic acid should contain a portion of aromatic dicarboxylic acid to provide an effective wire enamel.

Additionally, acyl halides of polycarboxylic acids may be employed, such as terephthaloyl dichloride or lower dialkyl esters thereof, such as methyl, ethyl, propyl, butyl, etc. terephthalates or isophthalates, as well as half esters thereof, such as monomethyl terephthalate, as well as mixtures of such esters and acids or acid halides. For example, a particularly useful ingredient for wire enamels is dimethyl terephthalate. As used herein, the term "carboxylic acid" is meant to also include carboxylic acid anhydrides, acryl halides of polycarboxylic acids, and esters or half esters of polycarboxylic acids, and, for example, a dialkyl ester of terephthalic acid is considered to be in the class of aromatic dicarboxylic acids.

Useful fluorine-free polyols can include: (1) diols, such as neopentyl glycol; ethylene glycol, propylene glycol; 1,3-propane diol; 1,4-butane diol; 1,2-butane diol, and the like, and their mixtures, and (2) triols, such as tris (2-hydroxy alkyl) isocyanurate, where alkyl is preferably ethyl; glycerine; pentaerythritol; inositol; trimethylol propane; trimethylol ethane; sorbitol, and the like, and their mixtures. A preferred polyol is tris (2-hydroxyethyl) isocyanurate, which provides good heat aging properties.

Useful fluorinated aliphatic alcohols are monohydric alcohols having a perfluoroalkyl group of from 4 to 12 carbon atoms. These fluorinated aliphatic monohydric alcohols can have the structural formula:

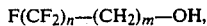

$F(CF_2)_n-(CH_2)_m-OH$, where n is an integer from 4 to 12, m is an integer from about 2 to about 12, and where $F(CF_2)_n-$ is the perfluoroalkyl group. In the preferred fluorinated aliphatic alcohols, n is an integer from 6 to 10 and m is an integer from about 2 to about 4. A mixture of these fluorinated alcohols can be used. The inclusion of this particular class of fluorinated aliphatic alcohols is critical in providing lubricity to the polyester type wire enamel. In this invention a mixture of fluorine-free polyol and fluorinated aliphatic alcohol is essential.

Additionally, up to 40 wt. % of polyisocyanates can be added to the polyester component. Examples include isocyanates such as 2, 4-tolylene diisocyanate; 2, 6-tolylene diisocyanates; cyclopentylene diisocyanate, and a host of others. In many instances the polyisocyanates are used with compounds which block the isocyanate groupings, such as monohydric phenols, monohydric alcohols, and a host of others. In many instances, small effective amounts of catalysts, such as a tetra alkyl titanate, for example, tetraisopropyl titanate or tetrabutyl titanate can be used. Also, metal driers, such as zinc, lead, calcium or cadmium linoleates, octoates and resinates may also be added to improve the properties of the wire enamel. Reference can be made to Meyer et al., U.S. Pat. No. 3,342,780, herein incorporated by reference, for further listings and details regarding these additive ingredients. Useful solvents for the polyester type resins could include cresylic acid or phenol, alone, or diluted with petroleum naphtha or xylol.

In some wire enamel applications, polyfunctional amino compounds may also be included in the wire enamel formulations, such as aromatic diamines, or amino alcohols, such as monoethanol amine, to provide polyester imide enamels, as detailed by Schmidt et al., in U.S. Pat. No. 3,793,250, herein incorporated by reference. In other wire enamel applications, blends of: (1) polymeric amide-imideesters of trimellitic anhydride, organic amino material, such as methylene dianiline, and polyol, at least a portion of which is a tris (hydroxy alkyl) isocyanurate, (2) polyesters of organic acids and polyols, and (3) isocyanate compounds, are used, as detailed by Sattler, in U.S. Pat. Nos. 3,555,113 and 3,652,471, both herein incorporated by reference. All of these before described wire enamels will be considered herein to be included in the term "polyester type" wire enamels.

In all of the before described polyester type wire enamel systems, the non-fluorinated polyol of the straight polyester or blend of ingredients to get for example, a polyester-amide-imide, can be substituted for with a fluorinated aliphatic alcohol from 8 wt. % to 30 wt. %. Under 8 wt. % fluorinated alcohol little lubricating effect occurs, not enough of the fluorinated reactant being chemically combined in the polymer matrix to provide a useful lubricated wire coating. Over 30 wt. %, polymerization would be severely inhibited, and line speed wire cure would be lengthened to a commercially unacceptable level.

Generally, the reactants are mixed in various sequences in a reaction kettle equipped with a stirrer, nitrogen sparge, thermometer, and a condenser, and reacted at from about 160° C. to about 225° C. After cooling, the reaction product is cut with solvent to from about 40 wt. % to 75 wt. % solids content, to provide a wire enamel containing a lubricity entity as an integral part of the enamel. The wire enamel is applied to copper or aluminum wire by either a dip or die application procedure to a build of up to about 3 mils. Wire speeds are generally about 25 feet/minute to about 40 feet/minute. In the process, the coated wire passes through a heating tower to cure the enamel and bond it to the wire. The cured wire can then be wound onto reels for storage and subsequently used in an automatic winding machine to make coils for electric motors or the like.

EXAMPLE 1

A reaction kettle is set for straight reflux. It is then charged with: 1140 pounds of dimethylterephthalate, a dialkyl ester of terephthalic acid; 198 pounds of ethylene glycol; 358 pounds of fluorinated aliphatic monohydric alcohol having the structural formula $F(CF_2)_nCH_2CH_2OH$, where n is from 4 to 12 with an average of 8, having a fluorine content of about 69.6% (sold commercially by DuPont under the tradename Zonyl BA); 764 pounds of tris (2-hydroxyethyl) isocyanurate; 4.5 pounds of tetraisopropyl titanate catalyst; 72 pounds of cresylic acid; and 27 pounds of xylol cosolvent. Of the active, non-solvent admixture components, polyol plus fluorinated alcohol, i.e., ethylene glycol+tris (2-hydroxyethyl) isocyanurate+Zonyl BA, constitutes 53.5 wt. %. Of the combined polyol plus alcohol, the fluorinated aliphatic alcohol constitutes 27.1 wt. %.

With minimum nitrogen sparge, the kettle is heated to 160° C. to melt the solid ingredients, and then the agitator is started. The kettle temperature is raised to 180° C. at 10° C./hour, then to 210° C. at 15° C./hour, and held at 210° C. to a Ball and Ring of 105° C.±2. The reaction mixture is then cooled and cut with 1660 pounds of phenol and 1310 pounds of Solvesso-100, an aromatic naptha solvent derived from petroleum, to provide an enamel solution of 45% to 50% solids.

The polyester type wire enamel is then coated onto No. 18 American Wire Gage copper wire in a 15 foot vertical enameling tower at a hot spot temperature of about 400° C., with a build of about 3 mils. Inclusion of 8 wt. % to 30 wt. % of fluorinated aliphatic alcohol, based on the total weight of wire enamel alcohol content would provide a wire enamel having lubricity characteristics which could be easily coated onto wire to provide enameled wires having a lubricated surface coating and also having good thermal and chemical stability. These enameled wires would be especially useful in automatic coil winding operations, to make electrical coils having a plurality of turns of lubricated enameled wire.

We claim:

1. An electrical conductor having a lubricated surface coating of a cured polyester enamel, the enamel comprising at least one reacted blend of components, the blend of components comprising:
   (A) a polycarboxylic acid component comprising at least a portion of aromatic dicarboxylic acid, and
   (B) hydroxyl components comprising a fluorinated aliphatic alcohol, and one or more non-fluorinated polyols wherein at least a portion of said polyols is tris (2-hydroxy alkyl) isocyanurate, where the fluorinated aliphatic alcohol has a perfluoroalkyl group of from 4 carbon atoms to 12 carbon atoms and constitutes from 8 wt. % to 30 wt. % of the total fluorinated alcohol plus non-fluorinated polyol content of the enamel.

2. The electrical conductor of claim 1, where, in the enamel, the fluorinated aliphatic alcohol, in the enamel blend, has the structural formula $F(CF_2)_n-(CH_2)_m-OH$, where n is an integer from 4 to 12 and m is an integer from about 2 to about 12.

3. The electrical conductor of claim 2, where, in the fluorinated alcohol structural formula, n is an integer from 6 to 10 and m is an integer from about 2 to about 4.

4. The electrical conductor of claim 2, where, the fluorinated aliphatic alcohol is $F(CF_2)_nCH_2CH_2OH$, where n averages 8.

5. The electrical conductor of claim 1, where the enamel blend further comprises a solvent and has a solids content of from about 40 wt. % to about 75 wt. %, and where, in the enamel blend, said isocyanurate is tris (2-hydroxy ethyl) isocyanurate.

6. The electrical conductor of claim 1 wherein the conductor is a wire selected from the group of copper wire and aluminum wire.

7. An electrical coil comprising a plurality of turns of the lubricated enameled wire defined in claim 6.

8. An electrical conductor having a lubricated surface coating of a cured polyester enamel, the enamel comprising at least one reacted blend of components, the blend of components comprising:
   (A) a polycarboxylic acid component comprising at least a portion of aromatic dicarboxylic acid, and
   (B) hydroxyl components comprising a fluorinated aliphatic alcohol, and non-fluorinated polyol selected from the group consisting of neopentyl glycol; ethylene glycol; propylene glycol; 1,3-propane diol; 1,4-butane diol; 1,2-butane diol; tris (2-hydroxy alkyl) isocyanurate; glycerine; pentaerythritol; insitol; trimethylol propane; trimethylol ethane; sorbitol; and mixtures thereof, where the flurinated aliphatic alcohol has a perfluoroalkyl group of from 4 carbon atoms to 12 carbon atoms and constitutes from 8 wt. % to 30 wt. % of the total fluorinated alcohol plus non-fluorinated polyol content of the enamel.

9. The electrical conductor of claim 8, where, in the enamel, the fluorinated aliphatic alcohol, in the enamel blend, has the structural formula $F(CF_2)_n-(CH_2)_m-OH$, where n is an integer from 4 to 12 and m is an integer from about 2 to about 12.

10. The electrical conductor of claim 9, wherein, in the fluorinated alcohol structural formula, n is an integer from 6 to 10 and m is an integer from about 2 to about 4.

11. Th electrical conductor of claim 9, where, the fluorinated aliphatic alcohol is $F(CF_2)_nCH_2CH_2OH$, where n averages 8.

12. The electrical conductor of claim 8, where the enamel blend further comprises a solvent and has a solids content of from about 40 wt. % to about 75 wt. %, and where, in the enamel blend, the non-fluorinated polyol component is tris (2-hydroxy ethyl) isocyanurate.

13. The electrical conductor of claim 8 wherein the conductor is a wire selected from the group of copper wire and aluminum wire.

14. An electrical coil comprising a plurality of turns of the lubricated enameled wire defined in claim 13.

* * * * *